UNITED STATES PATENT OFFICE.

ALBERT F. W. MEYER, OF CHICAGO, ILLINOIS.

COFFEE-CLEARING COMPOSITION.

1,239,930.     Specification of Letters Patent.     Patented Sept. 11, 1917.

No Drawing.     Application filed July 13, 1916.     Serial No. 109,056.

*To all whom it may concern:*

Be it known that I, ALBERT F. W. MEYER, a citizen of the United States, residing at Chicago, in the county of Cook and State of Illinois, have invented certain new and useful Improvements in Coffee - Clearing Compositions, of which the following is a specification.

My invention relates to a coffee-clearing composition and has for its object to provide an inexpensive and efficient product that, properly used in making the beverage from the ground coffee, will advantageously detannate and clarify the beverage. ("Beverage" and "coffee" are herein used distinctively to identify the liquid and the ground bean.)

The efficacy of albumen to detannate and clarify the beverage is well known, but the common usage among restaurant-cooks and house-wives of mixing with the coffee, or putting into the beverage in the making, a body of prepared albumen, egg white, or egg shell, with its adhering albumen, is generally wasteful of the albumen and not certain in the attainment of the desired results. My invention provides an inexpensive product for admixture with the coffee that insures proper distribution of the albumen for highly efficacious and economical results, and that combines in its action a mechanical filtering and precipitating effect with the chemical activity of the albumen.

My novel product consists essentially of granulated, absorbent, non-floating, preferably-tasteless, carrying agent, thickly coated throughout with albumen. Specific variations may, of course, be made in the preparation of embodiments of my invention, but I will, for purposes of disclosure particularly set forth one available embodiment thereof, although without intent to limit myself thereto in the broader aspects of my invention, for many changes in detail might be made without departure from the invention and within the scope of the appended claims.

In the preferred embodiment of my invention I employ a base of a granulated, porous, substantially tasteless cellulose material that will be a substantially inert carrying agent having good absorbent and filtration qualities. Specifically I preferably employ granulated wood particles, preferably of maple or other relatively hard wood, treated to remove all resinous elements and the like, to leave only the substantially inert cellulose structure. Other cellulose materials, such as paper pulp, may, however, be employed and an effective treatment for preparing a granular maple body may be performed by first treating the wood in a caustic bath, such as about ten per cent. solution of soda, and subsequently thoroughly washing and drying the cellulose material.

The granulation of the material is preferably such as to divide the cellulose into bodies roughly approximating in size and shape ordinary ground coffee, and it is in particles of about this size that I preferably market my product, although of course the size of granular particles may be widely varied without departure from the spirit of my invention.

Some absorbent, inert, granular bodies suitable as carrying agents for the albumen have a specific gravity greater than 1 and may be used as a carrying base without weighting, but where such a buoyant substance as prepared maple granules is employed as a base it is necessary, for the best practice of my invention, to weight the particles with some inert substance, in order that they may sink in the beverage for filtering and clarifying purposes. For this purpose of weighting the carrying agent, I preferably employ a mineral that, in the beverage, is chemically substantially inert, that is substantially tasteless, and preferably is itself porous. Powdered pipe clay, (as could be made by grinding up ordinary clay pipes) may be used with excellent results, and other relatively heavy minerals of like characteristics as to porosity, weight and inertness may be employed, as for instance chemically purified stone dusts.

The albumen employed is applied to act as a coating for the inert body and a binder for the weighting material. I prefer to use white of egg, attenuated with water, and in preparing the product I first mix the absorbent base with the dilute albumen, and then add to the mixture enough of the weighting material to raise the specific gravity of the coated particles so that it will be not quite able to float in the beverage. The albumen before application may be mixed with sugar or gelatin or both to make it more adherent. In practice one formula that I have found to be effective (though I do not limit myself to the precise quantities or materials) is:

| | Parts by weight. |
|---|---|
| Albumen | 10 lbs. |
| Water | 5 lbs. |
| Maple granules | 20 lbs. |
| Pipe clay | 4 lbs. |
| Sugar | 1 lb. |

Whereas I have described for the purpose of making a clear disclosure, a particular composition of materials of which my product may be made, it is to be understood that many variations and changes of proportions and materials may be made without departing from the spirit of the invention and the scope of the appended claims.

Having described my invention, what I claim is:—

1. A beverage clarifier comprising a granular, porous cellulose material, a weighting material added thereto, and a coating of albumen.

2. A beverage clarifier comprising comminuted wood particles having a coating of intermixed albumen and a weighting material.

3. A beverage clarifier comprising comminuted wood particles having a coating of intermixed albumen and pipe clay.

4. The process of preparing a coffee clearing product which consists in admixing albumen and a weighting agent, intermingling therewith comminuted particles of porous cellulose material and drying the product.

5. The process of preparing a coffee clearing product which consists in admixing liquid albumen with an adhesive, intermingling therewith particles of comminuted material of approximately the size and shape of ground coffee, and drying the product in its comminuted state.

6. The process of preparing a coffee clearing product which consists in admixing liquid albumen and particles of comminuted material of approximately the size and shape of ground coffee, and drying the product in its comminuted state.

7. A beverage clearing material for admixture with ground coffee comprising intermixed albumen, a weighting material, and an adhesive.

In testimony whereof I hereunto set my hand in the presence of two subscribing witnesses.

ALBERT F. W. MEYER.

In the presence of—
STANLEY W. COOK,
MARY F. ALLEN.